United States Patent Office 3,850,993
Patented Nov. 26, 1974

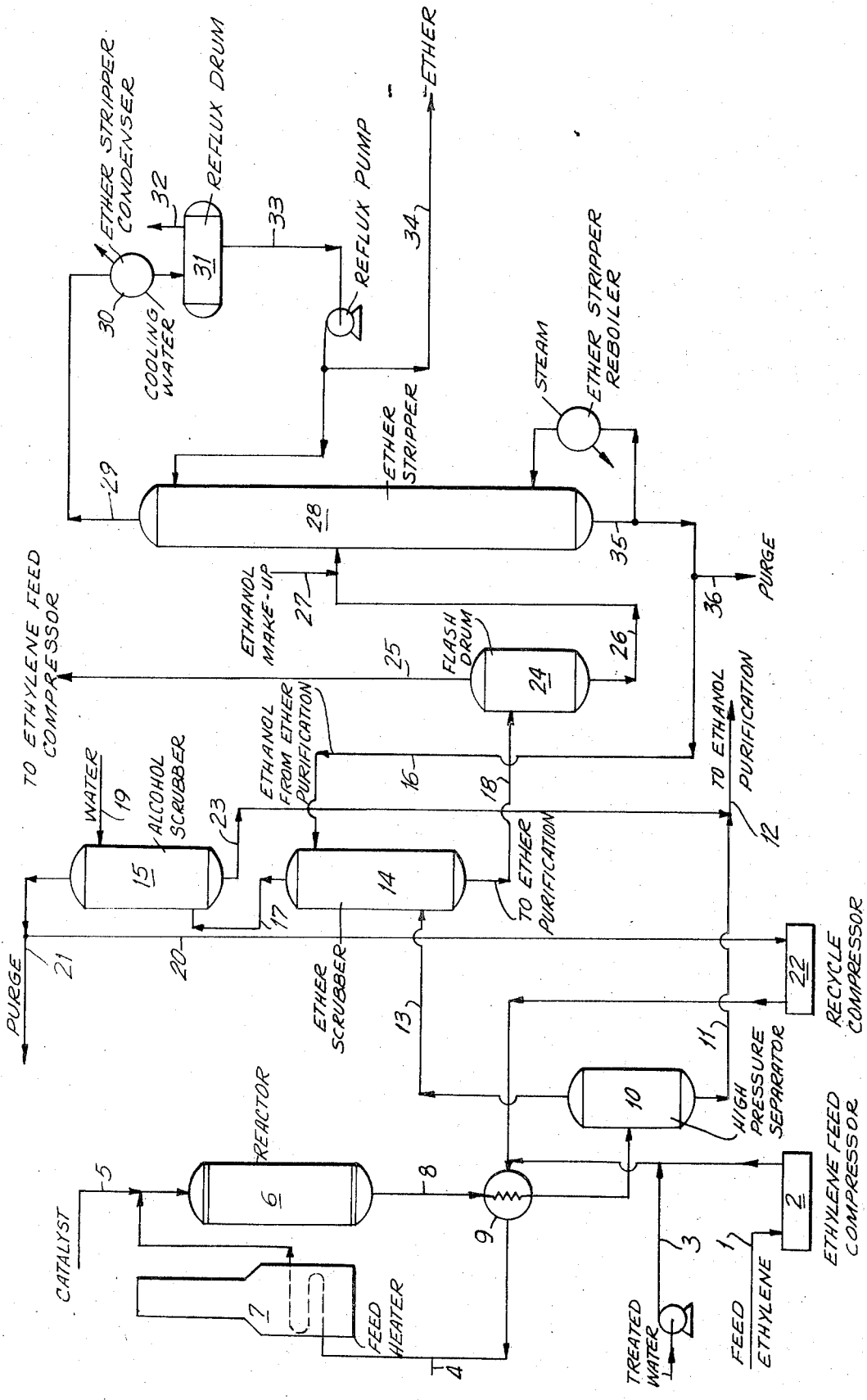

3,850,993
RECOVERY OF ETHER IN THE PRODUCTION OF ETHANOL BY ETHYLENE HYDRATION
Robert L. Kylander, Tuscola, Ill., and Richard H. Du Von, Jr., Cincinnati, Ohio, assignors to National Distillers and Chemical Corporation, New York, N.Y.
Continuation-in-part of abandoned application Ser. No. 149,058, June 1, 1971. This application Apr. 17, 1973, Ser. No. 351,931
Int. Cl. C07c 29/04, 41/00
U.S. Cl. 260—614 A                  6 Claims

ABSTRACT OF THE DISCLOSURE

Ether is recovered as a by-product in the production of ethanol by ethylene hydration. The reaction mixture formed in the hydration reaction is cooled within a high pressure separator and the uncondensed gases removed therefrom are scrubbed with liquid, aqueous ethanol to absorb substantial amounts of the ether contained therein. The ether is thereafter recovered by flashing a major portion of the residual ethylene from the ethanol stream, and thereafter stripping the ether from the ethanol. The ethanol stream is thereafter recycled directly to the scrubbing zone for further ether recovery, the concentration of the ethanol recycle being maintained substantially constant to thereby avoid the necessity of adding large quantities of make-up ethanol.

RELATED APPLICATION

This is a continuation-in-part of copending application Ser. No. 149,058 filed June 1, 1971 and now abandoned.

BACKGROUND OF THE INVENTION

One of the most satisfactory processes for the production of ethyl alcohol is the direct hydration process. As taught in Johson et al., Synthetic Ethyl Alcohol, Chemistry & Industry, pages S28–S31 (Aug. 10, 1953), gaseous ethylene and water vapor are chemically combined over a hydration catalyst to produce the ethanol. Small amounts of by-products are formed and the principal side reaction is the formation of diethyl ether. Aldehydes are also produced as by-products. However, since one of the most important requirements for commercial ethanol is the permanganate time, the product from the hydration reaction is generally hydrogenated to convert the aldehydes into alcohols. The hydrogenated product is then introduced into a light-ends column where the light by-product, principally diethyl ether, are taken overhead. Typically, only small amounts of diethyl ether are formed or recovered.

Both the ethanol and diethyl ether are valuable items of commerce. Bassett et al. U.S. Pat. No. 1,395,940 indicates that volatile solvents such as ether and alcohol can be recovered from air or other gases by passing the gas through a plurality of towers countercurrent to an absorbing agent adapted to dissolve the solvents. The patent discloses the use of a dilute alcohol containing from 40–70 parts by volume alcohol and from 30–60 parts by volume water to absorb ether or other volatile solvents contained in the gaseous stream. In the direct hydration process, however, recovery of the ether concomitantly produced in the reaction has not been seriously cotemplated. Hence, in Metzger Patent No. Re. 20,505 the possibility of passing the gaseous mixture from the hydration reaction through a multi-stage condenser and condensing the ether in addition to the ethanol product is mentioned, but it is recommended that the ether not be condensed but rather be recycled to the hydration reaction zone (Metzger Re. 20,505, page 3, column, 1, lines 18–40).

Australian Pat. No. 272,855 of Nov. 7, 1963 refers to washing the gaseous mixture formed in the ethylene hydration reaction, but neither describes nor suggests the recovery of diethyl ether from such mixture. To the contrary, the successive washes referred to in the Australian patent are proposed to purify the gaseous mixture recycled to the hydration zone in order to (1) reduce the heat load on the reactor feed heater, (2) improve the life of the hydration catalyst, (3) improve the compressor life, and (4) promote additional alcohol production by the recycle of an alcohol-free gas to the reaction (Australian Pat. No. 272,855, page 3, lines 1–24).

It is a principal object of the present invention to provide an improved process for the production of ethanol by direct hydration, in which the diethyl ether by-product may be readily and efficiently recovered. In accordance with a further object of the invention, ether recovery is effected utilizing an ethanol scrubbing operation without, however, necessitating the addition of substantial quantities of make-up ethanol.

SUMMARY OF THE INVENTION

The present process involves the production of ethanol by reacting ethylene and water vapor in the presence of a hydration catalyst at temperatures of from about 200° to 315° C. and under pressures of from about 400 to 1500 p.s.i.g. to obtain a gaseous reaction mixture containing ethanol, diethyl ether, ethylene, water vapor and other impurities; cooling the reaction mixture within a high pressure separator zone maintained at temperatures of from about 15° to 110° C. and under pressures of from about 400 to 1500 p.s.i.g. to condense and separate at least a portion of the ethanol and water from the reaction mixture; and recycling the residual, uncondensed gases for further reaction. In accordance with this invention the ether by-product formed in the hydration reaction is recovered in quantities of at least about 2% of the ether incorporated in the uncondensed gases removed from the high pressure separator zone, by contacting these gases with liquid, aqueous ethanol of from about 50 to 200 proof, while maintaining the liquid-gas mixture at contact temperatures of from about 15° to 110° C. and at pressures of from about 400 to 1500 p.s.i.g. to absorb the ether in the liquid ethanol. The ether thus scrubbed from the gaseous reaction mixture may then be efficiently recovered as a useful by-product of the direct hydration process.

In accordance with a further feature of the invention, the ether is recovered by initially separating, e.g., by flashing, most of the residual ethylene from the effluent from the ethanol scrubber, distilling the remaining ethanol stream to recover the desired ether by-product overhead, and recycling the ethanol-containing bottoms to the scrubber for further recovery of ether. It has been found that by so proceeding, the addition of large quantities of make-up ethanol is not required.

Other objects and advantages of the improved process of the present invention will be apparent from the following detailed description of preferred embodiments thereof, considered in connection with the accompanying drawing in which:

BRIEF DESCRIPTION OF THE DRAWING

A flow sheet illustrating the sequential operations in the ethylene hydration process, including the operations utilized for the removal and recovery of by-product ether, is given in schematic form.

PREFERRED EMBODIMENTS OF THE INVENTION

As shown in the accompanying drawing, an ethylene make-up feed stream 1 is initially passed through a feed compressor 2, admixed with a water stream 3, and added to a principal ethylene feed mixture 20. The composite feed stream 4 is then combined with a catalyst stream 5 and introduced into a hydration reactor 6. The gaseous ethylene-water stream is, however, first fed through a preheat exchanget 9 and feed heater 7 to produce a gaseous mixture hydrated within reactor 6 at temperatures of from about 200° to 315° C., preferably between about 230° and 315° C., and under pressures of from about 400 to 1500 p.s.i.g., preferably at least about 500 p.s.i.g. The particular reaction temperatures and pressure utilized are dependent upon catalyst activity and desired ethanol production rate, the lower reaction temperatures and pressures specified in the above ranges being feasible with catalysts having higher activities.

Any suitable hydration catalyst may be utilized in catalyst stream 5. Any of the known catalysts such as phosphoric acid, sulfuric acid or the like can be so employed; the preferred catalyst is a supported phosphoric acid. A reactant ratio of about 0.4 to 1 mole of water per mole of ethylene can be used, although for economic considerations, a water to ethylene molar ratio of about 0.6 is usually preferred.

An effluent stream 8 is removed from the hydration reactor, comprising a gaseous mixture of water vapor, residual ethylene, ethanol and a number of by-products, the principal of which is diethyl ether but which also include aldehydes such as acetaldehyde and crotonaldehyde, and a small amount of ethylene polymers. This mixture is then fed through a preheat exchanger 9 and into a high pressure separator 10 to cool the gases and condense and separate most of the water and ethanol constituents thereof.

Suitably, the reaction mixture is cooled to temperatures of from about 15° to 110° C., preferably to about 50° to 60° C., within the high pressure separator zone, to effect the desired condensation. The separation within zone 10 may be carried out under substantially the same pressure conditions employed within the hydration reactor 6 (subject, of course, to any pressure drops within the equipment), i.e., at pressures of from about 400 to 1500 p.s.i.g., preferably at least about 500 p.s.i.g. Most desirably, pressures of from about 850 to 950 p.s.i.g. are maintained within the separator 10.

An aqueous ethanol condensate stream 11 is thus recovered. This stream may be combined with alcohol removed from the ether recovery system described hereinafter, and recovered as product stream 12 for further purification. The ethanol may be purified employing any conventional techniques, e.g., by distillation, extractive distillation, rectification or hydrogenation, in order to obtain the required permanganate time. Usually, the concentrated and rectified ethanol is hydrogenated over a nickel or copper catalyst to convert aldehyde by-products into saturated alcohols which do not influence the permanganate test time, and the saturated alcohols thus formed are separated from the desired ethanol product.

The gaseous mixture which is not condensed in separator 10 principally comprises unreacted ethylene, diethyl ether, ethanol and water. This mixture is fed as stream 13 into a scrubber section comprising an ether scrubber 14 and a subsequent alcohol scrubber 15; the scrubbing zones 14 and 15 may be provided by separate towers or, alternatively, may comprise sections of the same tower.

In either event, ether is scrubbed from the uncondensed gaseous mixture in scrubber 14 by contact with a liquid, aqueous ethanol stream 16. The residual gases, still containing some ether in addition to unreacted ethylene, ethanol and water, are removed overhead through stream 17, while the liquid ethanol stream containing the ether extracted from the uncondensed gases is removed as stream 18 for purification of the ether by-product.

It has been found in accordance herewith that substantial quantities of ether may be recovered employing ethanol scrubbing streams varying from as low as about 50 to as high as about 200 proof. Preferably, streams of from about 90 to 150 proof are so utilized, ethanol of from about 120 to 140 proof being found particularly useful in commercial installations. The molar liquid: gas contact ratios utilized in the scrubber when such scrubbing media are employed may vary from as low as about 0.03 to as high as about 4.0 (when ethanol streams of relatively low proofs within the above ranges are employed). When, however, scrubbing streams having the preferred ethanol concentrations are employed in scrubber 14, operation at liquid:gas mole ratios of from about 0.04 to 0.35, and preferably at ratios of from about 0.08 to 0.20, have been found particularly suitable. When scrubbing streams of the indicated proofs and liquid:gas ratios within the designated ranges are used, absorption and recovery of up to 50% and more of the ether in the uncondensed gases introduced into the scrubber is obtained.

Scrubber 14 is maintained at contact temperatures of from about 15° to 110° C., preferably at from about 50° to 60° C. At the same time the pressure is maintained within substantially the same range utilized in the high pressure separator 10, e.g., at pressures of from about 400 to 1500 p.s.i.g., preferably at least about 500 p.s.i.g., pressures of from about 850 to 950 p.s.i.g. being particularly useful.

When the noted conditions are maintained within the ether scrubber quantities of 2% or more of the ether incorporated in the uncondensed gaseous mixture are absorbed in the ether recovery stream 18. The upper limit of ether recovery which may be achieved in accordance herewith is dependent on the proof of the ethanol scrubbing medium, the liquid to gas contact ratio within the scrubber, the temperature and pressure conditions maintained therein and, of course, the particular design of the scrubber tower utilized. Amounts of 25% and up to 50% or more of the ether contained in the uncondensed gaseous mixture may be thus removed in the scrubber and recovered as a useful by-product of the hydration reaction.

The residual gaseous stream 17 fed to the alcohol scrubber 15 is scrubbed therein with a water stream 19 to remove additional ethanol therefrom. The remaining gaseous stream 20 comprises principally unreacted ethylene, together with a predetermined amount of diethyl ether not scrubbed from the vapor mixture in scrubber 14. A portion of these gases may be purged through line 21 while the balance is fed to recycle compressor 22 for recycle to the hydration reactor. It is admixed with the make-up ethylene feed stream 1 supplied in an amount equal to that lost in the form of product ethanol and ether, and other by-products and losses due to leaks or quantities of ethylene dissolved in the various liquid effluents.

Finally, the alcohol removed from the gaseous stream in scrubber 15 is recovered for ethanol purification as additional product stream 23.

The ethanol scrubbing medium introduced into scrubber 14 is maintained within the designated ranges of proof to effect the desired ether extraction without requiring the addition of substantial amounts of make-up ethanol. To maintain these concentrations, the ethanol scrubbing stream 16 is preferably produced, and the ether by-product stream 18 purified, by the ether recovery system illustrated. In accordance therewith, the ether-containing ethanol stream 18 is initially introduced into flash drum 24 to separate ethylene in the overhead 25 therefrom. The remaining ethanol-ether mixture is recovered as bottoms 26 from the flash drum. The temperatures and pressures utilized in the flash drum may be varied within wide ranges depending on the desired economics of the process, the particular plant installation employed and whether it is desired to remove the unreacted ethylene, in part or entirely, and/or by distillation rather than by flashing.

Bottoms stream 26 is mixed with a make-up ethanol stream 27 as required, and the ether removed therefrom within an ether stripper 28. An ether stream 29 removed overhead is passed through condenser 30 and reflux drum 31, light ends vapor vent stream 32 being removed from the reflux drum, and the balance of the ether-rich mixture being returned through line 33 for reflux and recovery of an ether product stream 34.

Aqueous ethanol is removed as underflow stream 35 from the ether stripper, a minor portion of this stream being purged through line 36 and the major portion being returned as stream 16 to scrubber 14 for further ether recovery. By suitable control over the flow rates to, and the temperature and pressure conditions in, ether stripper 28 the proof of the ethanol scrubbing stream 16 is maintained substantially constant, for any predetermined ethanol and ether recovery rates.

If relatively large amounts of diethyl ether and/or ethanol are removed from the recycle gases, more diethyl ether and/or ethanol is manufactured in the reactor; conversely, if lesser quantities of diethyl ether and/or ethanol are removed from the recycle gas, correspondingly smaller amounts of diethyl ether and/or ethanol are manufactured. Thus, by judicious control of the ether and alcohol concentrations in the recycled gas, the production and recovery of both ethanol and diethyl ether can be simultaneously controlled.

Previously, the diethyl ether recovered in direct hydration processes has been quite small, ranging up to about two gallons for every 100 gallons of alcohol produced. The process of the present invention, on the other hand, provides a technique whereby the amount of diethyl ether recovered can be varied as desired up to about 15 gallons of ether or more, per 100 gallons of ethanol produced.

The following examples are presented to further illustrate the invention without, however, limiting the same. Unless otherwise specified, all temperatures are in degrees Centigrade and all parts and percentages are given by weight in both the examples and the ensuing claims.

EXAMPLES 1–12

A gaseous mixture of about 0.6 mole water vapor and 1 mole ethylene at about 1000 p.s.i.g. is heated to about 270° C. and introduced into a hydration reaction zone containing a phosphoric acid catalyst. The gaseous products of the reaction zone are cooled in a heat exchanger to a temperature of about 30° C., thereby condensing ethanol and water. The resulting gas is conveyed to an ether recovery zone at a rate of about 195 pounds per hour, in which zone it is contacted with an aqueous ethanol stream. The thus treated gases are thereafter scrubbed with water and the resulting water-ethanol mixture is combined with the condensed water and ethanol, rectified, and hydrogenated over a nickel catalyst.

The conditions in the ether recovery zone are varied with respect to ethanol proof, contact rate and ratio, temperature and pressure. The results are reported in Table I below:

TABLE I.—EXAMPLES 1-12

| | 1 | 2 | 3 | 4 | 5 | 6 | 7 | 8 | 9 | 10 | 11 | 12 |
|---|---|---|---|---|---|---|---|---|---|---|---|---|
| Liquid ethanol to ether recovery zone: | | | | | | | | | | | | |
| Proof | 125.8 | 126.6 | 123.2 | 126.2 | 189.6 | 100.2 | 98.0 | 72.0 | 82.1 | 90.2 | 95.2 | 189.8 |
| Gal./hr | 1.58 | 6.89 | 2.14 | 2.19 | 2.44 | 2.15 | 6.43 | 2.06 | 2.06 | 2.06 | 3.40 | 6.75 |
| Liquid ethanol from ether recovery zone: apparent proof | 127.8 | 127.9 | 131.9 | 126.9 | 76 | 100.5 | 97.5 | 80.6 | 86.7 | 90.5 | 95.2 | 194.7 |
| Pressure, p.s.i.g | 980 | 975 | 975 | 975 | 960 | 980 | 990 | 980 | 980 | 950 | 950 | 960 |
| Gas temperature, ° C | 30.5 | 31 | 31 | 30.5 | 28.5 | 28 | 28 | 29 | 28.5 | 28.5 | 28.5 | 27 |
| H₂O/ethanol molar ratio: | | | | | | | | | | | | |
| To ether recovery zone | 2.08 | 2.03 | 2.38 | 2.38 | 0.21 | 3.43 | 3.57 | 5.96 | 4.86 | 4.16 | 3.77 | 0.21 |
| From ether recovery zone | 2.04 | 1.94 | 2.32 | 2.44 | 7.23 | 2.83 | 2.71 | 5.08 | 4.46 | 4.31 | 3.82 | 1.02 |
| Ether/100 gal. 190 proof ethanol produced, gal | 3.5 | 7.8 | 6.0 | 4.9 | 5.2 | 3.7 | 5.2 | | | | 4.1 | 15.2 |

EXAMPLE 13

This example illustrates the stoichiometry of a further run carried out in the reaction system shown in the attached drawing. The quantities of the respective reactants and reaction products at the various points in the reaction system are indicated in the following tabulation, the respective numerals referring to the several flow streams shown in the drawing:

EXAMPLE 13

| Reaction stream | 1 | 3 | 4 | 8 | 11 | 12 | 13 | 16 | 17 | 18 | 19 | 20 | 21 | 23 | 25 | 26 | 27 | 32 | 34 | 36 |
|---|---|---|---|---|---|---|---|---|---|---|---|---|---|---|---|---|---|---|---|---|
| | | | Ether removal | | | | | | | | | | | | | | Ether recovery | | | |
| Ethylene | 27,590 | | 285,100 | 246,100 | 1,100 | 1,250 | 245,000 | | 240,000 | 5,000 | | 237,510 | 2,340 | 150 | 4,250 | 750 | | 650 | 100 | |
| Ethanol | | | 297 | 25,700 | 23,000 | 26,400 | 2,700 | 24,000 | 3,700 | 23,000 | | 297 | 3 | 400 | 70 | 22,930 | 1,300 | | | 230 |
| Ether | | | 18,170 | 22,800 | 800 | 900 | 22,000 | 150 | 18,450 | 3,700 | | 18,170 | 180 | 100 | 500 | 3,200 | 200 | 50 | 3,000 | |
| Water | | 109,043 | 109,633 | 98,600 | 98,000 | 128,000 | 600 | 18,000 | 600 | 18,000 | 30,000 | 590 | 10 | 30,000 | 20 | 17,980 | | | | 180 |
| Total, lb./hr | 27,590 | 109,043 | 393,200 | 393,200 | 122,900 | 156,550 | 270,300 | 42,150 | 262,750 | 49,700 | 30,000 | 256,567 | 2,533 | 33,650 | 4,840 | 44,860 | 1,500 | 700 | 3,100 | 410 |

It will be understood that various modifications can be made in the preferred embodiments of the ethylene hydration process described hereinabove without departing from the scope of the present invention. Accordingly, the preceding description is intended as illustrative and not in a limiting sense.

What is claimed is:

1. In a process for the production of ethanol by ethylene hydration, which comprises (1) reacting ethylene and water vapor in the presence of a hydration catalyst at temperatures of from 200° to 315° C. and under pressures of from 400 to 1500 p.s.i.g. to obtain a gaseous reaction mixture containing ethanol, diethyl ether, ethylene and water vapor; (2) cooling the reaction mixture within a high pressure separator zone maintained at temperatures of from 15° to 110° C. and under pressures of from 400 to 1500 p.s.i.g. to condense and separate at least a portion of the ethanol and water from the reaction mixture; and (3) recycling the residual, uncondensed gases; the improvement which comprises recovering at least 2% of the diethyl ether in the uncondensed gases removed from step (2) by (a) contacting the gases with liquid ethanol of from 50 to 200 proof while maintaining the liquid-gas mixture at contact temperatures of from 15° to 110° C. and at pressures of from 400 to 1500 p.s.i.g. to absorb the diethyl ether in the liquid ethanol, and (b) recovering the diethyl ether from the ethanol stream.

2. The process of Claim 1, in which the ethylene and water vapor are reacted in step (1) at temperatures of from 230° to 315° C. and under pressures of from 500 to 1500 p.s.i.g., the reaction mixture is cooled within the high pressure separator zone in step (2) under pressures of from 500 to 1500 p.s.i.g., and diethyl ether in the uncondensed gases removed from the high pressure separator zone is recovered by scrubbing said gases with ethanol of from 90 to 150 proof and in a liquid to gas molar ratio of from 0.04 to 4.0 while maintaining the liquid-gas mixture at pressures of from 500 to 1500 p.s.i.g.

3. The process of Claim 2, in which the reaction mixture is let-down to pressures of from 850 to 950 p.s.i.g. in the high pressure separator zone in step (2), and from 2% to 25% of the diethyl ether is recovered by scrubbing the uncondensed gases removed from said zone with ethanol in a liquid to gas molar ratio of from 0.08 to 0.20 while maintaining the liquid-gas mixture at contact temperatures of from 50° to 60° C. and at pressures of from 850 to 900 p.s.i.g. to absorb the ether in the ethanol stream.

4. The process of Claim 1, wherein the residual gas remaining after absorption of the diethyl ether in step (a) is scrubbed with water to remove additional ethanol therefrom, the remaining gases being recycled directly to the hydration reaction zone in step (3).

5. The process of Claim 1, in which the ether-containing ethanol stream from step (a) is flashed to remove ethylene therefrom, the residual stream is distilled to recover the ether overhead, and the ethanol-containing bottoms are recycled to step (a) to scrub the uncondensed gases removed from the high pressure separator zone, and thereby recover additional diethyl ether therefrom.

6. The process of Claim 5, wherein the residual gas remaining after absorption of the diethyl ether in step (a) is scrubbed with water to remove additional ethanol therefrom, the remaining gases being recycled directly to the hydration reaction zone in step (3).

(References on following page)

References Cited

UNITED STATES PATENTS

| | | | |
|---|---|---|---|
| Re. 20,505 | 9/1937 | Metzger | 260—641 |
| 2,044,414 | 6/1936 | Wilkinson | 260—641 |
| 2,807,652 | 9/1957 | Carrier | 260—614 A |
| 1,395,940 | 11/1921 | Bassett et al. | 260—616 |
| 2,579,601 | 12/1951 | Nelson et al. | 260—641 |
| 2,648,711 | 8/1953 | Carrier | 260—641 |
| 2,162,913 | 6/1939 | Eversole et al. | 260—614 A |
| 3,554,926 | 1/1971 | Statman et al. | 260—641 |
| 2,773,910 | 12/1956 | Shrader | 260—641 |

FOREIGN PATENTS

| | | | |
|---|---|---|---|
| 272,855 | 11/1963 | Australia | 260—641 |
| 798,260 | 7/1958 | Great Britain | 260—614 A |

HOWARD T. MARS, Primary Examiner

U.S. Cl. X.R.

260—616, 641